UNITED STATES PATENT OFFICE.

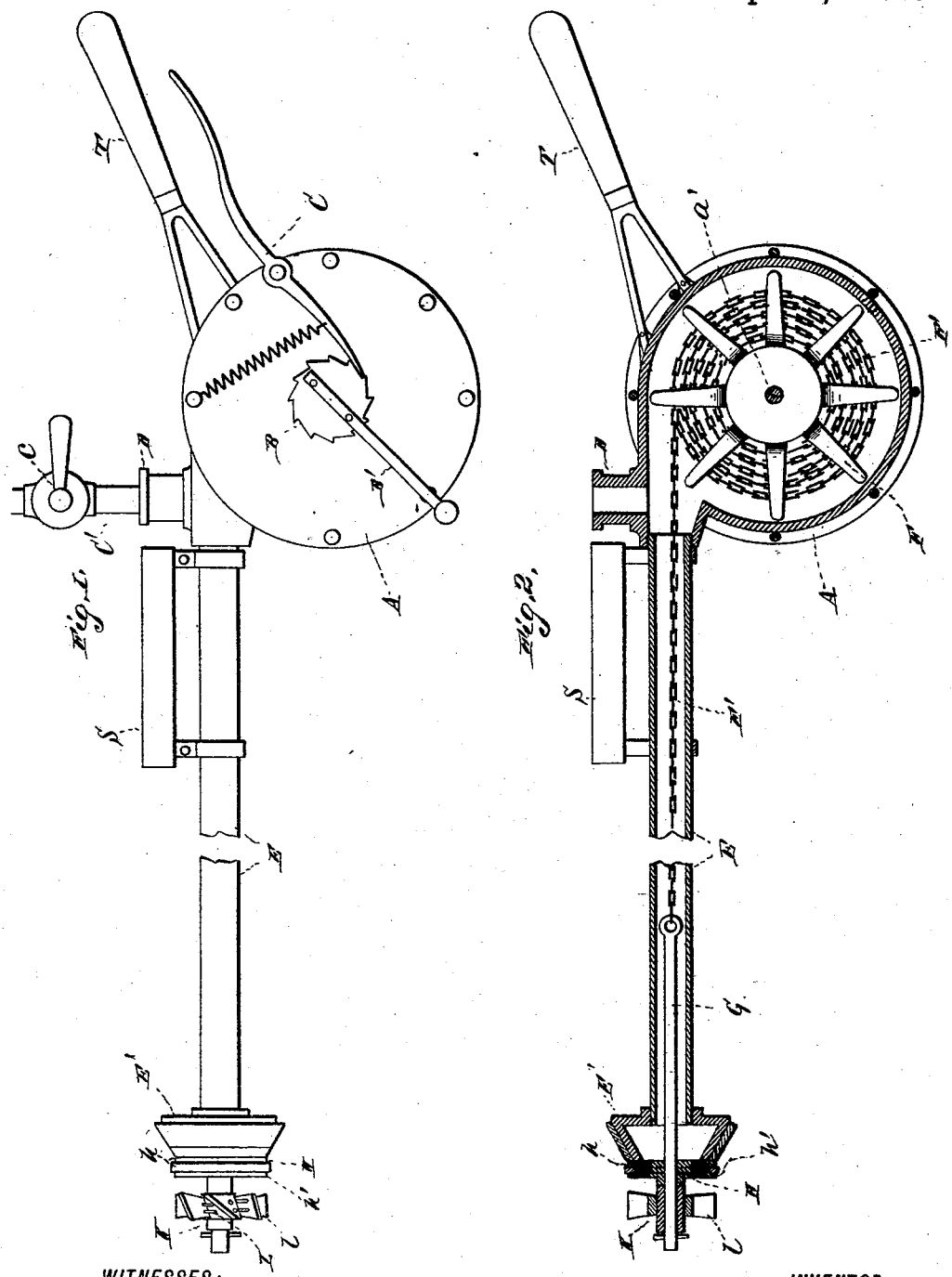

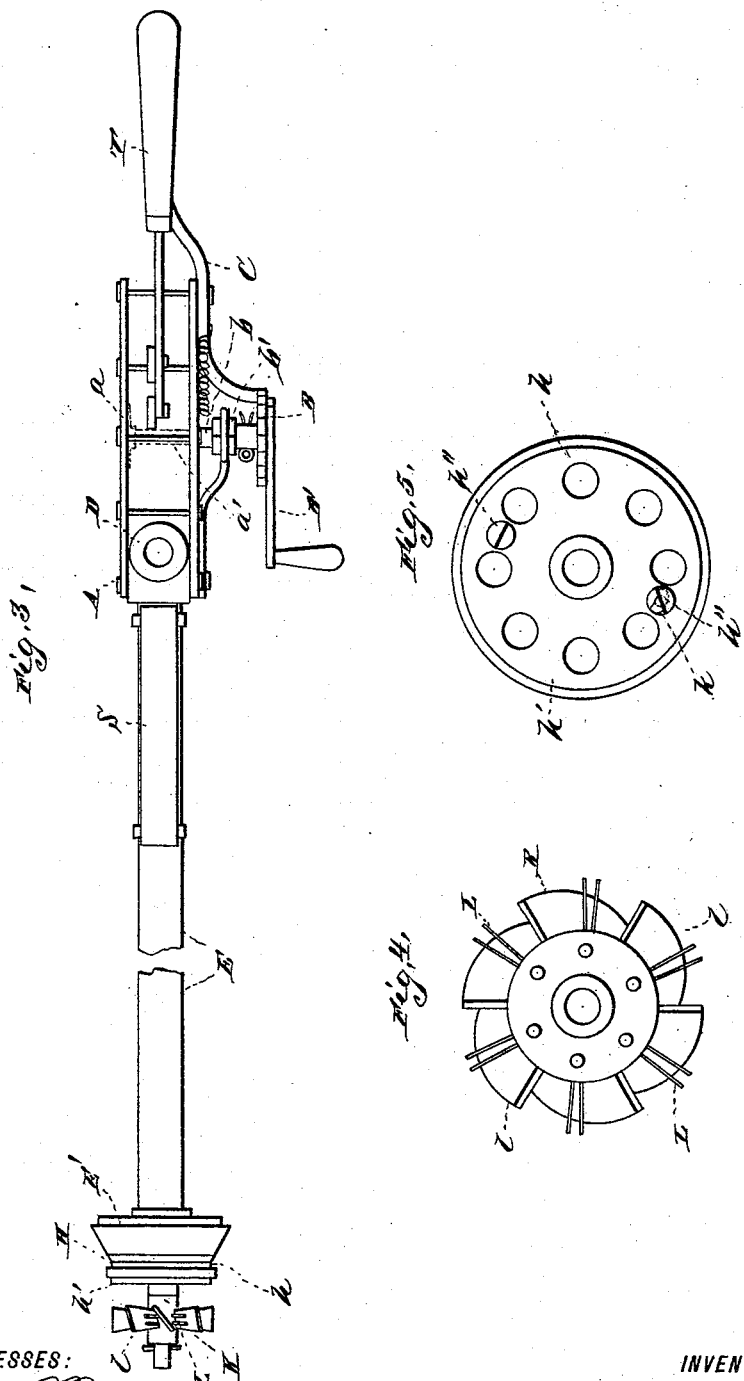

ENOS T. BELL, OF DUBLIN, INDIANA, ASSIGNOR OF ONE-HALF TO JAMES F. HATFIELD, OF SAME PLACE.

FLUE-CLEANER.

SPECIFICATION forming part of Letters Patent No. 459,346, dated September 8, 1891.

Application filed December 29, 1890. Serial No. 376,078. (No model.)

*To all whom it may concern:*

Be it known that I, ENOS T. BELL, a citizen of the United States, and a resident of Dublin, in the county of Wayne and State of Indiana, have invented certain new and useful Improvements in Flue-Cleaners; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1 of the drawings is a side view. Fig. 2 is a vertical longitudinal section. Fig. 3 is a top plan view, and Figs. 4 and 5 are detail views.

The invention has relation to certain new and useful improvements in flue-cleaning devices; and it consists in the novel construction and combination of parts hereinafter fully described.

In the accompanying drawings, illustrating the invention, A represents a steam-tight box or cylinder of suitable size and material sufficiently strong to resist considerable pressure and having upon the interior surface of one of its heads or ends a socket or bearing $a$, to receive one end of a shaft $a'$, the opposite end of which projects through the opposite head or end of the box or cylinder, and carrying a ratchet-wheel B and crank B', said crank and ratchet being removably secured thereto.

The shaft $a'$ has a loose bearing in the heads of the box or cylinder, and is provided at its projecting end with a stuffing-box or bushing $b$ and a follower $b'$ which prevent the escape of steam, while providing for the free revolution of the shaft. By making the ratchet B and the crank B' removable, the packing or stuffing in the box $b$ may be more conveniently renewed when desired, this arrangement also facilitating the packing of the parts for shipment. A spring-pawl C is provided to normally prevent the reverse movement of the ratchet and shaft.

At the point D is provided a steam-pipe or hose connection C', having a suitable valve $c$.

E is a pipe or tubing connected to the box or cylinder, and provided at its outer end with a nozzle-piece E', beveled, as shown, and provided with a rubber gasket to enable it to fit snugly into the end of a flue and form a steam-tight joint therewith, and preventing any rocking motion of the device when in operation.

On the interior of the box or cylinder the shaft $a'$ carries a suitable reel F, to which is attached one end of a chain, rope, or cable F', which extends down and through the pipe or tubing E, and is connected at its outer end to an eye of a rod or stem G. Near the outer end of this rod is secured a follower H, which consists of the circular perforated disks $h$ $h'$, having between the marginal edges a rubber connected by bolts $h''$. The perforations in the two disks are adapted to register; but the bolt-holes $k$ in the disk $h'$ are of somewhat oblong form, in order that the size of the registering portions of the apertures may be adjusted in accordance with the pressure of the steam employed in the box or cylinder A and pipe or tube E. When a high pressure is used, it is necessary to have the apertures at their full size or too much pressure will be exerted on the disk, rendering the operator unable to control the crank or causing the breakage of the chain. When a lower pressure of steam is used, the apertures are partially closed in order to get a greater pressure on the disk, for the purpose hereinafter described.

K represents a wheel or roller loosely journaled on the outer end of the rod H and adapted to revolve thereon in close proximity to the said follower. This wheel or roller has on its periphery one or more wings or vanes $l$, placed at such an angle to its axis as to cause the wheel to revolve when jets of steam are thrown against them obliquely through the apertures in the follower H. This wheel or roller is also provided with one or more rows of suitable steel brushes L, which, as the wheel revolves, will brush the deposits from the walls of the flue, aided also by the circumferential edges of the follower and its gasket. These brushes are made interchangeable, so that they may be readily replaced when worn.

In operating this device it is first connected to the boiler by an ordinary steam-hose with a union that connects with steam-pipe from the dome, and steam is admitted into the box or cylinder by means of the valve c. It is allowed to blow through the device for a few seconds to heat and clear the parts and the valve is then closed. The wheel and follower are then inserted into the end of the flue and the nozzle-piece E' adjusted to form a tight joint therewith. The steam is then again turned on, the crank grasped with one hand and the ratchet disengaged from its pawl, allowing the chain or cable to pay out under the pressure of the steam against the follower, which will be driven thereby the entire length of the flue. The jets of steam escaping through the apertures in said follower, striking against the oblique wings or vanes of the brush-wheel, will cause it to revolve at a very high rate of speed as it is driven through the flue, the brushes removing the deposit in a thorough and effective manner, the steam blowing it out and the follower acting as a wiper.

It will be seen that by the use of this device flues may be cleaned without putting out the fires, thereby causing a great saving of time.

A handle T may be provided for the device, as shown; also, a second handle S on the upper side.

Having thus described my invention, what I claim as new, and desire to secure by Letters Patent, is—

1. The flue-cleaner having the steam box and casing, a reel mounted in said box, a cable or chain connected at one end to said reel, and a cleaning device adapted to be operated by steam from the box, connected to the opposite end of said chain or cable, substantially as specified.

2. The flue-cleaner comprising a steam cylinder or box, a reel having bearings therein, a pipe or tubing connected to said box or cylinder, and a cable or chain connected at one end to said reel, passing through said pipe or tubing and carrying at its opposite end a brush adapted to be revolved by jets of steam from said box or cylinder, substantially as specified.

3. The combination, with the steam box or cylinder having journaled therein a reel or roller having its shaft projected through one end or head of the box and provided with a removable crank and ratchet and a pawl normally in engagement with said ratchet, of the cable or chain carrying said reel and having connected to its outer end a brush adapted to be revolved by jets of steam from said box, substantially as specified.

4. The combination, with the steam box or cylinder, its steam-supply inlet and valve, and the reel or shaft journaled therein, of the pipe or tubing connected to said box and having at its outer end a nozzle-piece adapted to form a steam-tight joint with the end of a flue, the chain or cable connected at one end to said reel, passed through said pipe or tubing and connected at its outer end to a wheel or brush, and a device for directing jets of steam from the box against said wheel, substantially as and for the purpose specified.

5. The combination, with the box or cylinder, of the shaft journaled at one end in a socket in the interior of one of the ends or heads of said box, its opposite end having a steam-tight bearing and projected through the opposite head of the box, a crank and ratchet removably secured to said shaft, a spring-pawl normally in engagement with said ratchet, and a reel mounted on said shaft inside of said box, substantially as specified.

6. In a flue-cleaner, the rotary brush-wheel having a series of interchangeable brushes and a series of obliquely-disposed peripheral vanes or wings, in combination with a disk or follower having the adjustable perforations or apertures arranged to throw jets of steam against the vanes of the brush-wheel, substantially as and for the purpose specified.

7. The combination, with the steam box or cylinder, of the pipe or tubing having the beveled nozzle-piece provided with the gasket and adapted to form a steam-tight joint with the end of a flue, and a steam-operated cleaning device working in said pipe, substantially as specified.

8. The steam box or cylinder having the internal socket or bearing, the shaft journaled at one end to said socket, the stuffing-box for the opposite end of said shaft, the reel on said shaft, the steam-inlet and its valve, and the pipe or tubing connected thereto, substantially as specified.

In testimony whereof I affix my signature in presence of two witnesses.

ENOS T. BELL.

Witnesses:
THOMAS C. MOORE,
JOHN A. GRIFFY.